Patented Apr. 27, 1937

2,078,323

UNITED STATES PATENT OFFICE 2,078,323

C-AMINO-SUBSTITUTED BARBITURIC ACID DERIVATIVES AND PROCESS FOR MAKING SAME

Rudolf Gebauer, Dresden, Germany, assignor to Chemische Fabrik von Heyden, A. G., Radebuel, near Dresden, Germany, a corporation of Germany No Drawing. Application January 6, 1934, Serial No. 705,569. In Germany January 6, 1933

11 Claims. (Cl. 260—33)

It is the object of the present invention to produce barbituric acids of the general formula

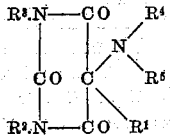

wherein $R^1$ represents any hydrocarbon group, $R^2$, $R^3$ and $R^4$ hydrogen or any hydrocarbon group and $R^5$ a hydrocarbon-group which may further be substituted, and wherein $R^4$ and $R^5$, together with the neighbouring N, may form a heterocyclic ring, which may be substituted further.

Barbituric acid derivatives of this kind are obtained by allowing monohalogenated barbituric acids of the general formula

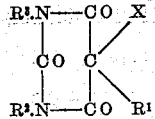

wherein $R^1$, $R^2$ and $R^3$ have the same signification as described above, and X represents halogen, to interact with primary or secondary amines or their substitution products, according to circumstances possibly in the presence of organic solvents.

Though brominated monoalkyl-barbituric acids have already been treated with organic amines, this was done in the presence of water (Hepner and Frenkenberg, Journ. f. prakt. Chemie 134, p. 250). This caused hydrobromic and carbonic acids to be split off and a smaller ring to be formed, the resulting substances being hydantoin derivatives; no substitution of the halogen by the amine group took place, as distinguished from the present invention. It has also been tried already, to allow dihalogenated barbituric acids to react with amines (Nightingale and Schaefer, Journ. Amer. Chem. Soc. 54 [1932], p. 236). Barbituric acids containing one halogen atoms and the amine group in the 5-position were thus supposed to result. However, later on it has been demonstrated, that the resulting substances are quaternary alkyl ammonium salts of the monohalogen-barbituric acid. Contrary to this, the compounds obtained according to the present invention represent derivatives of the 5-aminobarbituric acid free from halogen.

The exchange of the halogen atoms of 5-halogen-5-alkyl-barbituric acids against hydrogen by the action of hydrazine hydrat, as stated by Cox, Macbeth and Pennycuick (Jour. Chem. Soc. 1931, p. 1870–1874), allows to conclude, that the halogen atoms of these acids have a certain mobility, but allows no conclusion as to the halogen atoms being able to be replaced by basic groups. Much more, Nightingale and Schaefer (loc. cit.) have shown by treating dihalogenated barbituric acids with amines, that only one halogen atom is split off, while the other one sits very tight and is not replaced by the amine group. Thus it was not to be expected, that in treating 5-halogen-5-alkyl-barbituric acids with amines it would be possible to replace the halogen atom by basic groups.

The novel products of this invention have sedative and hypnotic properties which render them useful for medicinal purposes.

Example 1

A solution of 50 parts by weight of ethyl-brom-barbituric acid and 36 parts by weight of piperidine in 150 parts by volume of absolute alcohol is boiled with reflux for half an hour. After cooling the solution, piperidine hydrobromide is precipitated by adding ether. The precipitate being separated, alcoholic hydrochloric acid is added to the filtrate until the precipitation is complete. The crystals are sucked off, washed with ether, dried and then dissolved in water. In neutralizing the solution with sodium carbonate, a white precipitate is obtained, which after crystallization from acetone melts at 215° C. and according to its composition proved to be 5-ethyl-5-piperidino-barbituric acid. It is dissolved by acids as well as by alkalis.

Instead of ethyl-brom-barbituric acid, ethyl-chlor-barbituric acid can be used. The latter is obtained in crystals of the melting point of 191° C. by introducing chlorine in a hot solution of ethyl-barbituric acid in water.

Example 2

A solution of 50 parts by weight of ethyl-brom-barbituric acid and 40 parts by weight of aniline in 100 parts by volume of absolute alcohol is boiled with reflux for a quarter of an hour. The mixture is cooled, stirred into diluted sodium hydroxide solution and then extracted by benzol. The alkaline solution is then acidified with hydrochloric acid. 5-ethyl - 5 - anilido - barbituric acid is thus precipitated with good yield. When crystallized from water, it forms needles melting at 240° C. It is dissolved by diluted alkalis, but not by diluted acids.

Example 3

5 parts by weight of ethyl-brom-barbituric acid and 6 parts by weight of p-phenetidine are mixed, whereupon the temperature rises and a solid mass is obtained. This is mixed with diluted hydrochloric acid, sucked off, washed with alcohol and recrystallized from 90% acetic acid. The 5-ethyl-5-p-phenetidino-barbituric acid thus obtained forms white scales of the melting point of 244° C. and is dissolved by diluted alkalis, not by diluted acids. The yield is almost theoretical.

*Example 4*

1-methyl-5-ethyl-barbituric acid, obtained by condensing methyl-urea with the diethyl ester of ethyl-malonic acid, is brominated in the usual way. 30 parts by weight of the 1-methyl-5-ethyl-5-bromo-barbituric acid, thus obtained, are allowed to react with 21 parts by weight of piperidine in alcoholic solution in the same way as described in Example 1. The 1-methyl-5-ethyl-5-piperidino-barbituric acid, resulting with good yield, melts at 150° C. and dissolves readily in ether, acetone, alcohol, chloroform, hot benzene, acids and alkalis, while being difficultly soluble in water.

*Example 5*

1,3,5-trimethyl-barbituric acid, obtained by condensing sym. dimethyl-urea with the diethyl ester of methyl-malonic acid, is brominated in the usual way to form the 1,3,5-trimethyl-5-bromo-barbituric acid; 10 parts by weight of the latter are dissolved in 70 parts by volume of dry benzene and mixed with 10 parts by weight of piperidine dissolved in 30 parts by volume of dry benzene, whereupon the temperature rises and piperidine hydrobromide crystallizes out. The latter being separated, the filtrate is evaporated to dryness in vacuo. The residue is washed with water and recrystallized from 50% alcohol. The 1,3,5-trimethyl-5-piperidino-barbituric acid thus obtained in almost quantitative yield melts at 108° C. and forms long white needles, difficultly soluble in water, readily soluble in acids and organic solvents. By sodium hydroxide solution it is easily decomposed already in the cold to form the corresponding ureide.

*Example 6*

By allowing to react 7 parts by weight of 1,3,5-trimethyl-5-bromo-barbituric acid with 5 parts by weight of isoamyl-amine in dry benzene in the same way as described in Example 5, after separating the isoamyl-amine hydrobromide and evaporating the benzene filtrate, an oily residue is obtained, from which after dissolving in alcohol-ether and adding alcoholic hydrochloric acid, the hydrochloride of 1,3,5-trimethyl-5-isoamyl-amino-barbituric acid is precipitated in the shape of white needles with a very good yield.

*Example 7*

10 parts by weight of 1,3,5-trimethyl-5-bromo-barbituric acid and 10 parts by weight of ethyl-aniline are slowly heated on a water-bath up to 80° C. After the spontaneous reaction, which makes the temperature rise up to 100° C., has stopped and the brown colour has turned green, the mixture is cooled, dissolved in alcohol and stirred into very much diluted hydrochloric acid. 1,3,5-trimethyl-5-phenyl-ethylamino-barbituric acid is precipitated in good yield and, when recrystallized from 50% alcohol, shows the melting point of 108° C.

What I claim is:

1. Process for the manufacture of C-amino substituted barbituric acid derivatives containing in the 5-position besides an alkyl-group an amine group which is substituted, comprising treating barbituric acids containing in the 5-position an alkyl-group and a halogen-group with an amine containing at least one hydrogen atom at the trivalent nitrogen atom and being selected from the group of the alkylamines, the anilines, the aminophenolalkylethers and the piperidines.

2. Process for the manufacture of barbituric acid derivatives containing in the 5-position besides a hydro-carbon group an amine group which may be substituted, comprising treating barbituric acids containing in the 5-position a halogen group, with a mononuclear carbocyclic aryl mono-amine, which contains at least one hydrogen atom at the trivalent nitrogen.

3. Process for the manufacture of barbituric acid derivatives containing in the 5-position besides a hydro-carbon group an amine group which may be substituted, comprising treating barbituric acids containing in the 5-position a halogen group, with an aliphatic mono-amine, which contains at least one hydrogen atom at the trivalent nitrogen.

4. Process for the manufacture of barbituric acid derivatives containing in the 5-position besides a hydrocarbon group an amine group which may be substituted, comprising treating barbituric acids containing in the 5-position a halogen group, with a piperidine.

5. 1,3,5-trimethyl-5-isoamylamino-barbituric acid.

6. Barbituric acids of the general formula

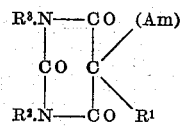

wherein $R^1$ represents an alkyl group, $R^2$ and $R^3$ are radicals taken from the class consisting of the alkyl groups and hydrogen, and (Am) is the radical of an amine selected from the alkyl-amines, anilines, aminophenol alkylethers and piperidines.

7. Barbituric acids according to claim 6, in which the radical $R^2$ is an alkyl group.

8. Barbituric acids according to claim 6, in which each of the radicals $R^2$ and $R^3$ is an alkyl group.

9. Barbituric acids according to claim 6, in which (Am) is piperidyl.

10. Barbituric acids according to claim 6, in which the radical $R^2$ is an alkyl group and (Am) is piperidyl.

11. Barbituric acids according to claim 6, in which each of the radicals $R^2$ and $R^3$ is an alkyl group and (Am) is piperidyl.

RUDOLF GEBAUER.